W. H. DANIEL.
GEAR SHIFTING MECHANISM.
APPLICATION FILED APR. 1, 1918.

1,299,557.

Patented Apr. 8, 1919.
2 SHEETS—SHEET 1.

Inventor,
W. H. Daniel, by
G. C. Kennedy,
Attorney.

W. H. DANIEL.
GEAR SHIFTING MECHANISM.
APPLICATION FILED APR. 1, 1918.
1,299,557.
Patented Apr. 8, 1919.
2 SHEETS—SHEET 2.
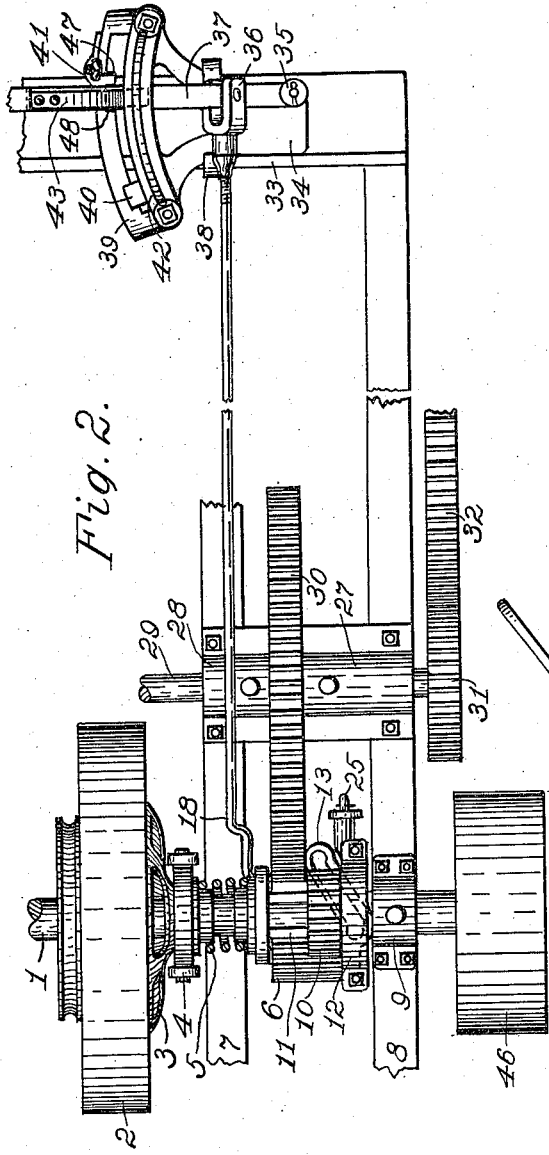
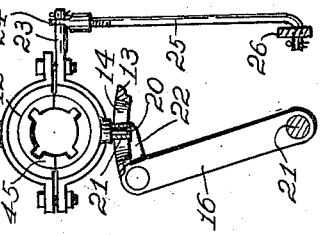
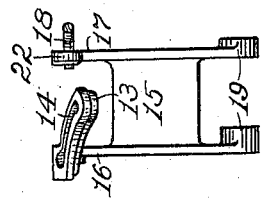
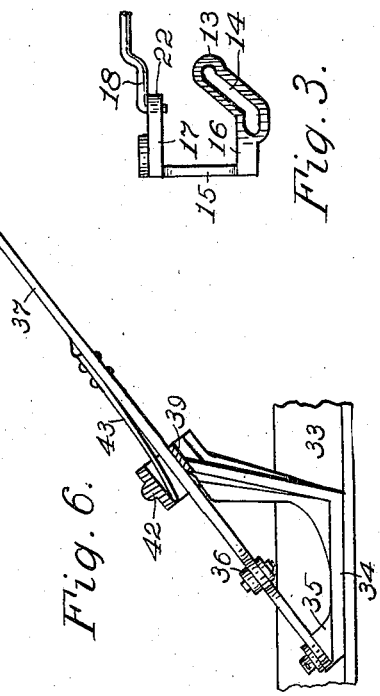
Inventor,
W. H. Daniel, by
G. C. Kennedy,
Attorney.

UNITED STATES PATENT OFFICE.

WILMER H. DANIEL, OF WATERLOO, IOWA, ASSIGNOR TO WATERLOO GASOLINE ENGINE COMPANY, OF WATERLOO, IOWA.

GEAR-SHIFTING MECHANISM.

1,299,557.     Specification of Letters Patent.     Patented Apr. 8, 1919.

Application filed April 1, 1918. Serial No. 225,936.

*To all whom it may concern:*

Be it known that I, WILMER H. DANIEL, a citizen of the United States of America, and a resident of Waterloo, Blackhawk county, Iowa, have invented certain new and useful Improvements in Gear-Shifting Mechanism, of which the following is a specification.

My invention relates to improvements in gear-shifting mechanism, and the object of my improvement is to furnish means for shifting power transmission gears to produce forward or reverse movements of a driven shaft, especially applicable for use on a tractor or the like.

This object I have accomplished by the means which are hereinafter described and claimed, and which are illustrated in the accompanying drawings, in which:

Fig. 2 is a plan view of the mechanism shown in said Fig. 1.

Fig. 3 is a detail plan of the pinion sliding body and Fig. 4 is an elevation thereof.

Fig. 5 is a detail view of said sliding-body as operatively connected to the coupling on a slidable pinion sleeve.

Fig. 6 is an end elevation of the manually operable shifting lever.

Similar numerals of reference denote corresponding parts throughout the several views.

Figure 1:
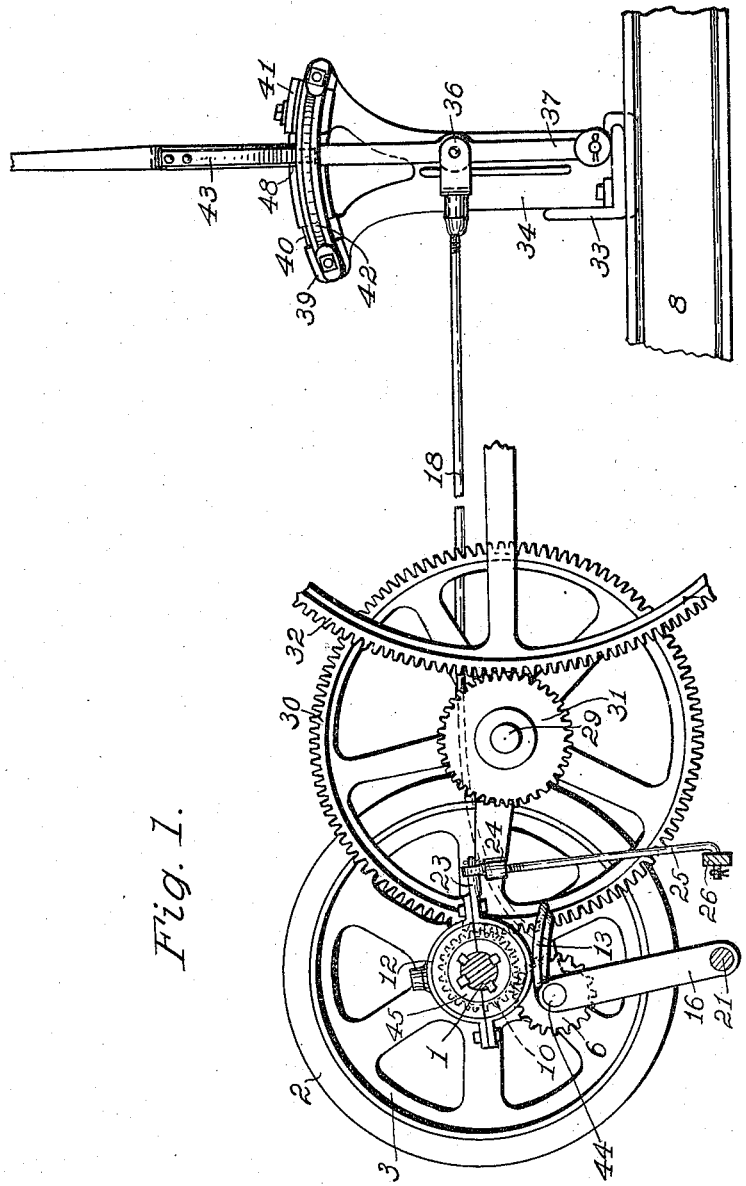
Figure 1 is a side elevation of my gear shifting mechanism as operatively connected to a driven shaft and gearing, with parts broken away.

My improved gear-shifting means is arranged for compactness as used on a tractor frame 8, where the operating space is very limited.

Upon the engine crank-shaft 1, a rotatable non-slidable friction-drum 2 is mounted, as also a coacting friction-clutch 3 mounted slidably non-rotatably thereon, and whose hub is pressed upon by a coiled spring 5 bearing against it yieldably, a shifting-fork 4 movably engages said hub, and is linked to a lever (not shown) for operating it and the clutch.

A pinion 10 is slidably mounted over splines 11 upon the shaft 1, the other end of said shaft being passed through a bearing 9 on the frame 8, and carrying a belt-wheel 46 at its extremity.

Underneath the shaft 1 is located a wide-toothed pinion 6 mounted on a shaft 44 rotatable in bearing orifices in the upper ends of spaced erect bodies 16 and 17, connected integrally by a cross-part 15. The lower ends of said bodies have alined orifices, permitting them to be mounted to rock on a fixed shaft 21 supported between the frame side-bar 8 and an inner frame-bar 7.

Referring to Figs. 3, 4 and 5, the erect body-part 16 carries an extension 13 provided with an oblique slot 14 having reversely-directed ends. This extension 13 is curved on a radius from the shaft 21. Upon the shaft 1 integral with the pinion 10 is a splined hub 45, about which a two-part sleeve 12 is fastened to rock thereon. This sleeve has a depending stud 20 carrying an anti-friction roller 21 which works in the slot 14 in the extension body 13.

The opposite erect body 17 has a short integral arm 22, orificed to receive a bent over end of a connecting-rod 18 which has a fork 36 adjustably mounted on its other end and pivotally connected to a hand-lever 37.

The hand-lever 37 has its lower end pivoted on a projection 35 of a rack-segment 34 fixed on a cross-bar 33 by clamps 38. This rack-segment has its arc-shaped top 39 grooved at 40, 48 and 47, to seat and releasably hold the lever in forward, neutral and reverse positions. An adjustable body 41 is mounted on the back of the part 39, which can be adjusted to locate a projection thereon more to the right, to shift the lever-seat 47 more in that direction. The rack-segment has a curved plate 42 secured over it in spaced relation, the lever working in the interspace freely, and a flat spring 43 has one end secured to the lever with its free end extending into said interspace to bear against the inner face of the plate 42, to yieldably resiliently hold the lever in any of said seats in which it may have been placed.

A gear-wheel 30 is mounted on a rotatable shaft 29 seated in bearings 27 and 28 on the frame-bars 7 and 8, and on the outer end of said shaft is a pinion 31 meshed with a gear-wheel 32, which latter may be that which is secured to and drives a traction-wheel (not shown).

Operation: When the hand lever is seated in the groove 48 of said rack segment, the connecting-rod 18 holds the pinion 6 and its supporting-body 16—17 in a neutral position, that is, in mesh with the pinion 10 and out of mesh with the gear-wheel 30, while the pinion 10 is also out of mesh with the gear-wheel 30 due to the sliding of the collar 45 by the rocking of the slotted extension 13 part way to the right, the collar 45 being fixed to and slidable on the shaft 1 together with said pinion 10.

The lever, when shifted to the groove 40, moves, by means of the rocking of the extension 13 forwardly, the pinion 10 into mesh with the gear-wheel 30. The wheel 30 then drives its connected train of gearing to rotate the traction-gear 32 forwardly.

When the lever is oppositely shifted from its neutral position, to be seated in the groove 47 of the rack-segment, the extension 13 is swung rearwardly which moves the pinion 10 out of mesh with the gear-wheel 30, sliding along the splines 11 and along the wide teeth of the other pinion 6, the pinion 6 being swung into mesh with the gear-wheel 30, and driving it and its connected gearing reversely.

Having described my invention, what I claim as new, and desire to secure by Letters Patent, is:

1. In a combination, a driving-shaft, a relatively narrow pinion slidably non-rotatably mounted thereon, a gear-wheel, a wide-toothed pinion in mesh with the first-mentioned pinion, the latter being slidable therealong while in mesh therewith, and a cam connected operatively between the said pinions, and movable to shift them simultaneously in different directions relative to said gear-wheel to alternately act thereon to impart opposite directions of rotation thereto.

2. In combination, a driving-shaft, a relatively narrow pinion slidably non-rotatably mounted thereon, a gear-wheel, a wide-toothed pinion in mesh with the narrow-toothed pinion with the latter slidable therealong while keeping in mesh therewith, a cam connected operatively between said pinions and movable to shift them in different directions to alternately act on said gear-wheel to impart opposite directions of rotation thereto, while placing both out of mesh with the gear-wheel when in a neutral position.

3. In combination, a driving-shaft, a relatively narrow pinion slidably non-rotatably mounted thereon, a gear-wheel, a wide-toothed pinion in mesh with the narrow-toothed pinion with the latter slidable therealong while keeping in mesh therewith, a rock-body in which said wide-toothed pinion is mounted having an oblique cam-groove, a sleeve rotatably non-slidably mounted on the hub of said slidable pinion having a cam projection extended movably into said cam-groove, and means for rocking said rock-body to either move both pinions out of mesh with said gear-wheel, or alternately move either of them into mesh therewith when the other is out of mesh therewith.

Signed at Waterloo, Iowa, this 18th day of March, 1918.

WILMER H. DANIEL.

Witnesses:
PEARL M. STANTON,
G. C. KENNEDY.